(12) United States Patent
Chinnadurai

(10) Patent No.: US 9,085,472 B2
(45) Date of Patent: Jul. 21, 2015

(54) GASIFICATION SYSTEM EMPLOYING EJECTORS

(75) Inventor: Uma Chinnadurai, Bangalore (IN)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 12/714,303

(22) Filed: Feb. 26, 2010

(65) Prior Publication Data

US 2011/0209406 A1 Sep. 1, 2011

(51) Int. Cl.
| | | |
|---|---|---|
| *B01J 7/00* | (2006.01) | |
| *C02F 1/20* | (2006.01) | |
| *C10J 3/46* | (2006.01) | |
| *C10J 3/84* | (2006.01) | |
| *C10K 1/00* | (2006.01) | |
| *C10K 1/10* | (2006.01) | |
| *C02F 103/36* | (2006.01) | |

(52) U.S. Cl.
CPC . *C02F 1/20* (2013.01); *C10J 3/466* (2013.01); *C10J 3/84* (2013.01); *C10K 1/003* (2013.01); *C10K 1/10* (2013.01); *C02F 2103/365* (2013.01); *C02F 2301/063* (2013.01); *C10J 2300/093* (2013.01); *C10J 2300/0906* (2013.01); *C10J 2300/0916* (2013.01); *C10J 2300/0973* (2013.01); *C10J 2300/169* (2013.01); *C10J 2300/1618* (2013.01); *C10J 2300/1628* (2013.01); *C10J 2300/1846* (2013.01); *C10J 2300/1884* (2013.01)

(58) Field of Classification Search
CPC .......... B01D 3/10; B01D 3/101; B01D 3/103; B01D 3/105; B01D 3/106; B01D 3/108
See application file for complete search history.

(56) References Cited

U.S. PATENT DOCUMENTS

| | | | | | |
|---|---|---|---|---|---|
| 4,242,102 | A | * | 12/1980 | Snell | 48/197 R |
| 5,209,762 | A | * | 5/1993 | Lowell | 95/192 |
| 5,415,673 | A | * | 5/1995 | Hilton et al. | 48/197 R |
| 6,036,748 | A | * | 3/2000 | Wallace et al. | 95/257 |
| 6,106,239 | A | * | 8/2000 | Wunner | 417/68 |
| 6,149,345 | A | * | 11/2000 | Atkins | 405/128.2 |
| 6,610,112 | B1 | * | 8/2003 | Klock et al. | 48/214 R |
| 6,983,602 | B2 | | 1/2006 | Senile | |
| 7,536,864 | B2 | | 5/2009 | Wolfe et al. | |
| 2002/0036069 | A1 | * | 3/2002 | Kettunen et al. | 162/47 |
| 2008/0035467 | A1 | * | 2/2008 | Torii et al. | 203/49 |
| 2009/0101598 | A1 | * | 4/2009 | Kain et al. | 210/771 |
| 2009/0120290 | A1 | | 5/2009 | Wallace et al. | |
| 2011/0049256 | A1 | * | 3/2011 | Schulze et al. | 239/1 |
| 2011/0162952 | A1 | * | 7/2011 | Conchieri et al. | 203/11 |

* cited by examiner

*Primary Examiner* — Imran Akram
(74) *Attorney, Agent, or Firm* — Fletcher Yoder P.C.

(57) ABSTRACT

In one embodiment, a black water processing system includes a vacuum pressure flash tank configured to separate gases from black water. The system also includes an ejector with a suction chamber and a nozzle. The suction chamber is coupled to the vacuum pressure flash tank, and the nozzle is configured to discharge a motive fluid across the suction chamber to create a vacuum within the vacuum pressure flash tank.

19 Claims, 3 Drawing Sheets

GASIFICATION SYSTEM EMPLOYING EJECTORS

BACKGROUND OF THE INVENTION

The subject matter disclosed herein relates to gasification systems employing ejectors, and more particularly, to black water processing systems employing ejectors.

Fossil fuels, such as coal or petroleum, may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns more efficiently and cleaner than the fuel in its original state. A byproduct of gasification is black water, which may include particles of ash, metals, ammonia, and organic matter as well as dissolved gases.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a black water processing system includes a vacuum pressure flash tank configured to separate gases from black water and an ejector with a suction chamber and a nozzle. The suction chamber is coupled to the vacuum pressure flash tank, and the nozzle is configured to discharge a motive fluid across the suction chamber to create a vacuum within the vacuum pressure flash tank.

In a second embodiment, a gasification system includes a high-pressure flash tank configured to separate gases from black water to produce a first discharge of the black water and a second discharge of separated gases. The gasification system also includes an ejector with a suction chamber and a nozzle. The nozzle is configured to discharge the second discharge across the suction chamber to create a vacuum.

In a third embodiment, a gasification system includes a gasifier configured to produce a synthetic gas and black water and a black water processing system. The black water processing system includes a high-pressure flash tank configured to flash the black water to produce a first vapor discharge of first separated gases and a first liquid discharge of the black water, and a vacuum pressure flash tank configured to flash the black water to produce a second vapor discharge of second separated gases and a second liquid discharge of the black water. The gasification system also includes an ejector with a suction chamber and a nozzle. The suction chamber is coupled to the vacuum pressure flash tank, and the nozzle is configured to discharge the first vapor discharge across the suction chamber to pull the second vapor discharge into the ejector from the vacuum pressure flash tank.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
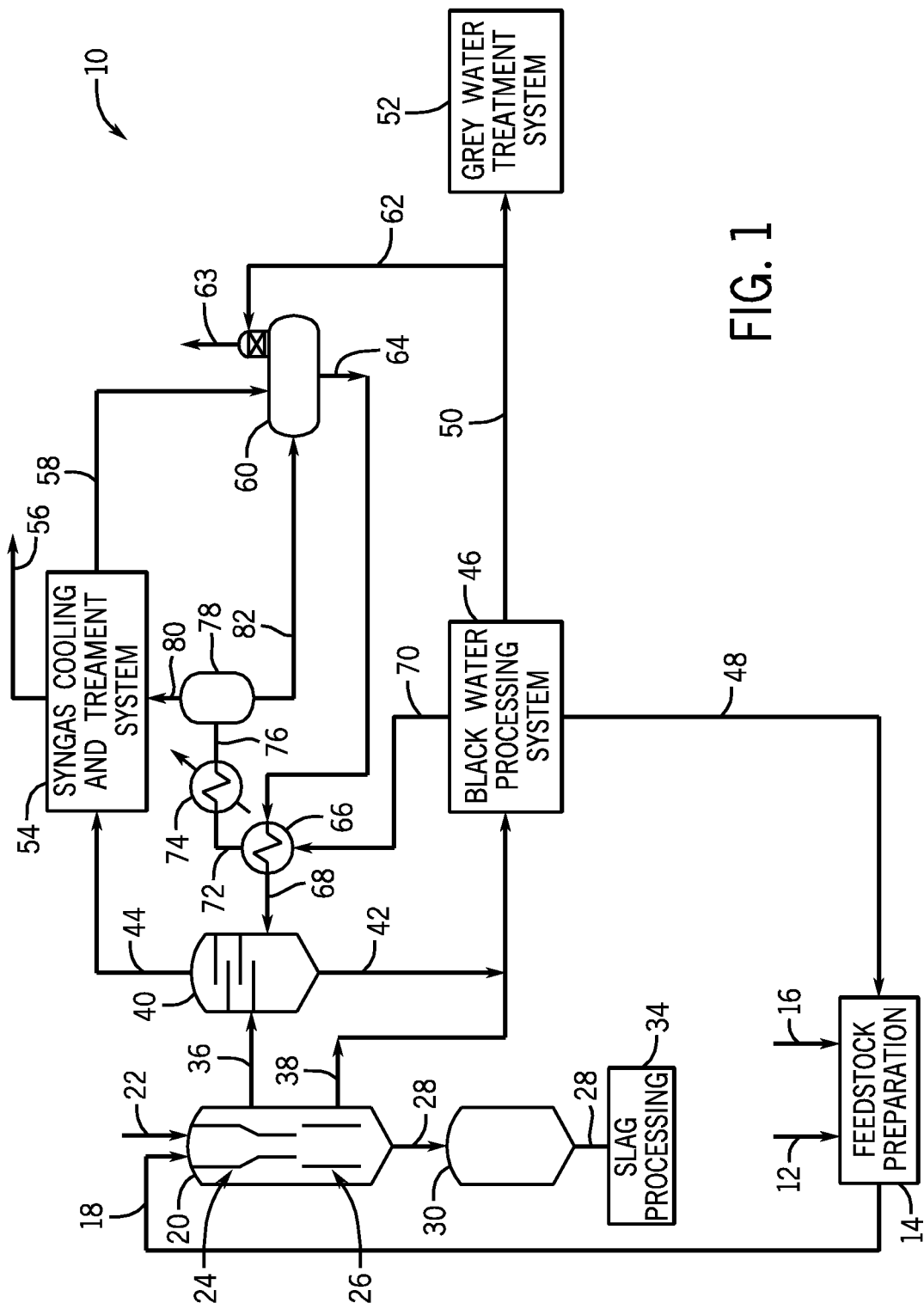
FIG. 1 is a schematic block diagram of an embodiment of a gasification system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gasification systems that employ ejectors to create a vacuum. In addition to producing syngas, gasification systems may produce black water that contains fine particles of ash, ammonia, metals, and organic material, as well as dissolved gases. Black water generally includes quench and/or scrubbing water that contains a relatively large amount of carbon containing solids. The black water may be processed through a series of flash tanks to separate the dissolved gases from the black water and produce black water concentrated with the fine particle solids. The series of flash tanks may include one or more high-pressure flash tanks, intermediate and/or low-pressure flash tanks, and vacuum flash tanks, with each flash tank in series having a progressively lower pressure to separate additional dissolved gases from the black water.

As disclosed herein, a vacuum may be created within the vacuum flash tanks through the use of an ejector. An ejector may generally include a nozzle that discharges a high-velocity jet across a suction chamber connected to a piece of equipment, such as a tank, that is to be evacuated. In particular, a suction chamber of the ejector may be coupled to the vacuum flash tanks and a high-pressure motive fluid may be discharged at a high velocity across the suction chamber to create a vacuum within the vacuum flash tanks. The ejector includes only stationary parts and therefore contains no moving parts, which may reduce capital and/or operating costs when compared to the use of a traditional liquid ring vacuum pump, which requires moving parts as well as a power supply and a water supply. The motive fluid used in the ejector may be steam or another high-pressure fluid. According to certain embodiments, the overhead discharge of separated gases from the high-pressure flash tank may be used as the motive fluid in the ejector.

FIG. 1 illustrates a gasification system 10 that may employ one or more ejectors. Within the gasification system 10, a carbonaceous fuel source 12 may be utilized as a source of energy to produce syngas. The fuel source 12 may include coal, petroleum coke, biomass, wood-based materials, agricultural wastes, tars, coke oven gas and asphalt, or other carbon containing materials.

The fuel source 12 may be introduced into the gasification system 10 via a feedstock preparation system 14. The feedstock preparation system 14 may resize or reshape the fuel source 12, for example, by chopping, milling, shredding, pulverizing, briquetting, or palletizing the fuel source 12 to create a fuel slurry 18. According to certain embodiments, the feedstock preparation system 14 may include a grinding mill. Further, within the feedstock preparation system 14, additives, 16, such as water, or other suitable liquids, may be added to the fuel source 12 to create the fuel slurry 18. However, in other embodiments, where no liquid additives are employed, the fuel slurry 18 may be a dry feedstock.

The fuel slurry 18 may be directed to a gasifier 20 where the fuel slurry 18 may be mixed with oxygen 22 and steam to produce syngas. In particular, the fuel slurry 18 may be reacted with a limited amount of oxygen (e.g., partial oxidation) at elevated pressures (e.g. from absolute pressures of approximately 20 bar to 85 bar) and temperatures (e.g., approximately 700° C. to 1600° C.) to partially oxidize the fuel slurry 18 and produce syngas. Due to chemical reactions between the oxygen 22, steam, and carbon within the fuel slurry 18, the syngas may include hydrogen, carbon monoxide, and carbon dioxide, as well as other less desirable components, such as ash, sulfur, nitrogen, and chloride, present in the carbonaceous fuel.

The gasifier 20 may include a reaction portion 24 where partial oxidation may occur and a quench portion 26 where cooling may occur. Within the reaction portion 24, the fuel slurry 18 may be heated to undergo a pyrolysis process. According to certain embodiments, temperatures inside the gasifier 20 may range from approximately 150° C. to 700° C. during the pyrolysis process, depending on the type of fuel source 12 utilized to generate the fuel slurry 18. The heating of the feedstock during the pyrolysis process may generate a solid, e.g., char, and residue gases, e.g., carbon monoxide, and hydrogen.

A combustion process may then occur in the gasifier 20. The combustion may include introducing oxygen to the char and residue gases. The char and residue gases may react with the oxygen to form carbon dioxide and carbon monoxide, which provides heat for the subsequent gasification reactions. According to certain embodiments, temperatures during the combustion process may range from approximately 700° C. to 1600° C. Next, steam may be introduced into the gasifier 20 during a gasification step. The char may react with the carbon dioxide and steam to produce carbon monoxide and hydrogen at temperatures ranging from approximately 800° C. to 1100° C. In essence, the gasifier 20 utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 20. This resultant gas may include approximately 85% of carbon monoxide and hydrogen, as well as methane, carbon dioxide, water, hydrogen chloride, hydrogen fluoride, carbonyl sulfide, ammonia, hydrogen cyanide, and hydrogen sulfide (depending on the sulfur content of the feedstock). Non-gasifiable ash material and unconverted and/or incompletely converted fuel slurry may be byproducts of the process that may exist as larger particles of molten slag and smaller particles, referred to as fines.

From the reaction portion 24, the syngas may enter the quench portion 26 where the syngas may be cooled and saturated. The quench portion 26 may be an integral part of the gasifier 20 as shown, or the quench portion 26 may be a separate unit. The quench portion 26 may cool the syngas to at or near a saturation temperature through evaporation of a cooling fluid, such as water, causing less desirable components to solidify. In particular, the molten slag may be rapidly cooled and solidified into coarse slag particles 28 that may be collected in the bottom of the quench portion 26.

The coarse slag 28 may flow, for example, by gravity, from the quench portion 26 into a pressurized lock hopper 30 at regular intervals. In certain embodiments, liquid, such as water, may be removed from the coarse slag 28 within the lock hopper 30 and returned to the gasifier 20. The coarse slag 28 may then be removed form the lock hopper 30 and directed to a slag processing system 34 where the slag 28 may be screened to reduce moisture and then directed to an offsite disposal facility. For example, the slag 28 may be used as road base or as another building material. According to certain embodiments, the slag processing system 34 may include a drag conveyer and/or a slag sump.

In addition to producing slag 28, the quench portion 26 may produce cooled syngas 36 and black water 38, which includes fine particles of slag produced by the gasifier 20. The cooled syngas 36 may be directed to a scrubber 40 where additional fines and other entrained gases, such as hydrogen chloride, may be removed. In particular, within the scrubber 40, the fines may be separated from the syngas to produce another stream of black water 42 that may exit a bottom portion of the scrubber 40 while scrubbed syngas 44 may exit through an upper portion of the scrubber 40.

The black water 42 exiting the bottom portion of the scrubber 40 may be combined with the black water 38 from the gasifier 20 and may be directed to a black water processing system 46. In other embodiments, the black water 38 and the black water 42 may be provided to the black water processing system 46 as separate streams. As described further with respect to FIG. 2, within the black water processing system 46, the black water 38 and 42 may be subjected to a series of pressure reductions that may cause the black water 38 and 42 to be partially evaporated and cooled to remove dissolved gases and concentrate the fines.

The black water processing system 48 also may include a settling process that produces separated fines 48 and grey water 50. The separated fines 48 may be recycled to the feed stock preparation system 14 where the fines may be used to provide additional fuel. The grey water 50 may be directed to a grey water treatment system 52 where the grey water 50 may undergo further processing to remove gases, such as ammonia, and solids.

After the additional black water 42 has been removed in the scrubber 40, the scrubbed syngas 44 may be directed to a syngas cooling and treatment system 54 where the syngas may be further purified to produce sweetened syngas 56. According to certain embodiments, the syngas cooling and treatment system 54 may include one or more water gas shift reactors that adjust the ratio of hydrogen to carbon monoxide in the scrubbed syngas 44. Further, the syngas cooling and treatment system 54 may include one or more acid gas removal processes that may remove acid gases, such as hydrogen sulfide, hydrogen chloride, hydrogen fluoride, among others. Further, the syngas cooling and treatment system 54 may include one or more stripping processes for removing ammonia. Moreover, a tail gas treatment process also may be included to remove residual gas components such as ammonia, methanol, or any residual chemicals from upstream processing, such as from a sulfur recovery unit. The sweetened syngas 56 may then be used for a variety of processes such as chemical processing or power generation.

The syngas cooling and treatment system 54 also may produce liquid 58 that may be used to facilitate deaeration within a deaerator 60. In particular, a portion 62 of the grey water 50 may be directed to the deaerator 60 to remove oxygen 63 and other dissolved gases that may cause corrosion in downstream components. The deaerator 60 may produce deaerated grey water 64 that may be heated within a heat exchanger 66 and directed to the scrubber 40 as heated grey water 68. The heat exchanger 66 may transfer heat to the deaerated grey water 64 using vapor 70 from the black water processing system 46. In particular, the vapor 70 may be directed through the heat exchanger 66 to transfer heat to the deaerated grey water 64 producing cooled vapor 72. The cooled vapor 72 may be further condensed within a condenser 74 to produce partially condensed vapor 76. The partially condensed vapor 76 may be directed to a knock out vessel 78 to separate the vapor 80 from liquid components 82, such as water. The vapor 80 from the knock out vessel 78 may be provided to the syngas cooling and treatment system 54 to assist with certain processes, such as ammonia stripping. The liquid 82 from the knock out vessel 78 may be directed to the deaerator 60 to facilitate deaeration.

Figure 2:
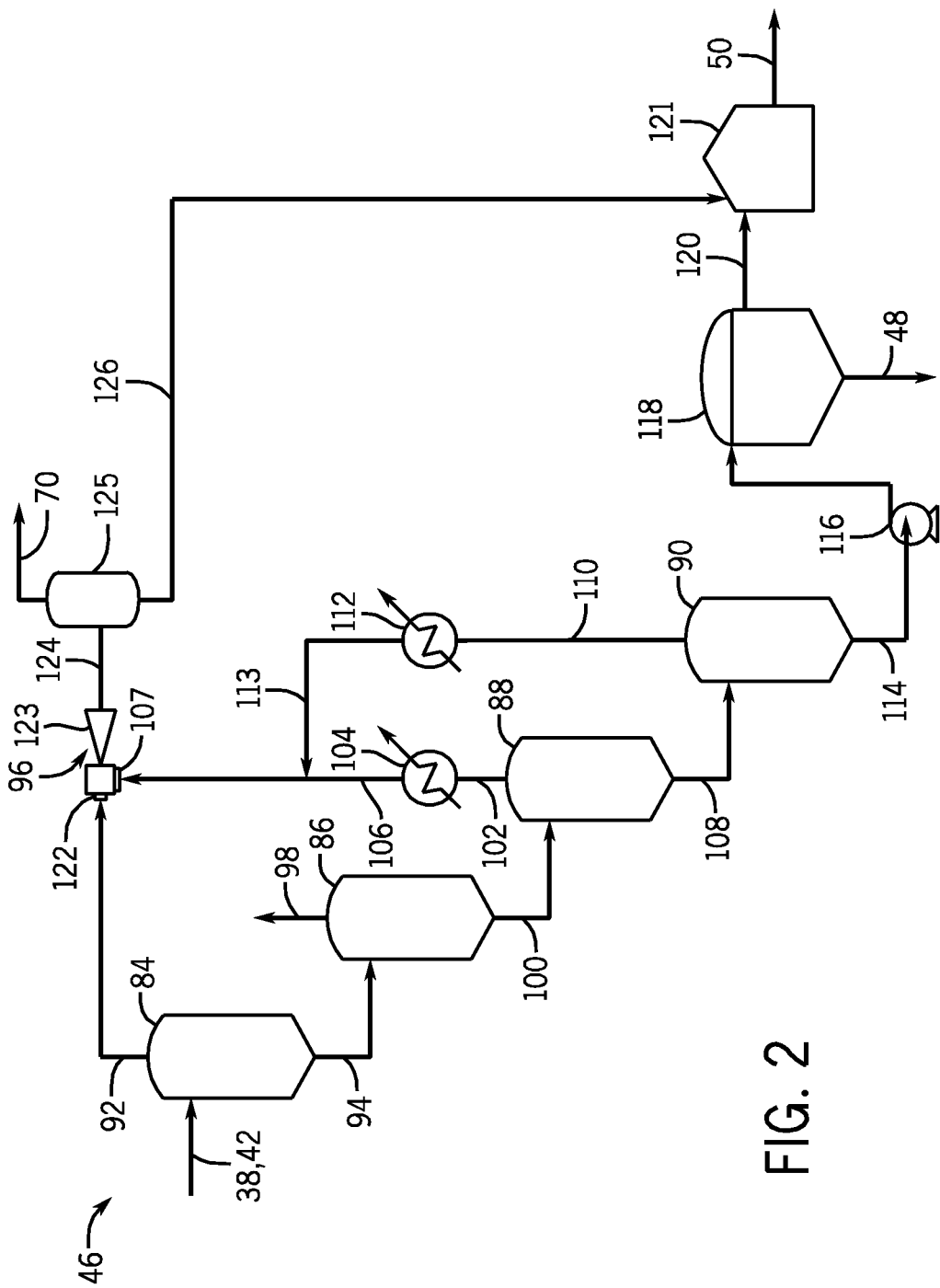
FIG. 2 is a schematic block diagram of an embodiment of the black water processing system of FIG. 1.

FIG. 2 depicts an embodiment of the black water processing system 46 that may employ an ejector. The black water processing system 46 includes four flash tanks 84, 86, 88, and 90. Although four flash tanks are shown, in other embodiments any number of flash tanks may be employed. Each flash tank 84, 86, 88, and 90 may promote separation of fines through a reduction in pressure that causes the black water to be partially evaporated and cooled, thereby separating dissolved gases from the fines. In particular, each flash tank 84, 86, 88, and 90 may subject the black water 38 and 42 to a progressively lower pressure, thereby facilitating further removal of dissolved gases at each flash tank 84, 86, 88, and 90. According to certain embodiments, the dissolved gases may include syngas, which may be recovered through the syngas cooling and treatment system 54 (FIG. 1).

The black water 38 and 42 may enter the black water processing system 46 through the high-pressure flash tank 84. According to certain embodiments, the high-pressure flash tank 84 may operate at a pressure of at least approximately 10 bar. However, in other embodiments, the high-pressure flash tank 84 may operate at any suitable pressure. Within the high-pressure flash tank 84, the vapor components (e.g., the separated gases) may be discharged as overhead vapor 92 through a top portion while a liquid discharge 94 of black water concentrated with fines may exit through a bottom portion.

The overhead vapor 92 from the high-pressure flash tank 84 may be provided to an ejector 96 to serve as the motive fluid for the ejector 96. As discussed further below, the ejector 96 may be used to create the vacuums within the vacuum flash tanks 88 and 90. The liquid discharge 94 from the high-pressure flash tank 84 may enter the low-pressure flash tank 86 where further separation of the vapor and liquid components may occur. In particular, the vapor components may be discharged as overhead vapor 98 through a top portion of the low-pressure flash tank 86 while a liquid discharge 100 of black water concentrated with fines may exit through a bottom portion. In certain embodiments, the overhead vapor 98 may be directed to the deaerator 60 (FIG. 1) to provide heat for the deaeration process. According to certain embodiments, the low-pressure flash tank 86 may operate at a pressure of approximately 2 bar. However, in other embodiments, the low-pressure flash tank 86 may operate as more of an intermediate-pressure flash tank with a pressure of approximately 2 to 10 bar. Moreover, in other embodiments, the low-pressure flash tank 86 may operate at any suitable pressure less than the pressure of the high-pressure flash tank 84.

The liquid discharge 100 from the low-pressure flash tank 86 may enter the first vacuum flash tank 88 where additional separation of the vapor and liquid components may occur. In particular, the vapor components may be discharged as overhead vapor 102 through a top portion of the first vacuum flash tank 88 while a liquid discharge 114 of black water concentrated with fines may exit through a bottom portion. The overhead vapor 102 may be condensed in a condenser 104 to produce at least partially condensed vapor 106 that may be directed to a suction chamber 107 of the ejector 96.

The first vacuum pressure flash tank 88 also may produce a liquid discharge 108 of black water concentrated with fines that may be directed to the second vacuum flash tank 90 for additional separation of the vapor and liquid components. In particular, the vapor components may be discharged as overhead vapor 110 through a top portion of the second vacuum flash tank 90 while a liquid discharge 114 of black water concentrated with fines may exit through a bottom portion. The overhead vapor 110 may be condensed in a condenser 112 to produce at least partially condensed vapor 113 that may be combined with the partially condensed vapor 106 and directed to the suction chamber 107 of the ejector 96. However, in other embodiments, the partially condensed vapors 106 and 113 may not be combined prior to entering the ejector 96. For example, in other embodiments, multiple ejectors 96 may be included and each condensed vapor 106 and 113 may enter a separate ejector 96.

The liquid discharge 114 from the second vacuum flash tank 90 may be directed through a pump 116 to a settling tank 118. Within the settling tank 118, the fines 48 may be separated and provided to the feedstock preparation system 14 for fuel, as described above with respect to FIG. 1. The remaining liquid 120 and any entrained vapor may be directed to a grey water tank 121 for storage of the grey water 50 prior to direction to the grey water treatment system 52 (FIG. 1). In certain embodiments, the grey water tank 121 may include a motive device for circulating suspended particles and also may serve to regulate flow to the grey water treatment system 52.

As described above, the overhead vapor 92 from the high-pressure flash tank 84 may be used as the motive fluid for the ejector 96. The ejector 96 is connected through the suction chamber 107 to the vacuum flash tanks 88 and 90. Within the ejector 96, the overhead vapor 92 may be discharged through a nozzle 122 as a high velocity jet across the suction chamber 107 to create a vacuum within the vacuum flash tanks 88 and 90. According to certain embodiments, the vacuum flash tanks 88 and 90 may have an absolute pressure less than approximately 0.5 bar. However, in other embodiments, any suitable pressure may exist in the vacuum flash tanks 88 and 90 where the pressure in vacuum flash tank 90 is less than the pressure in vacuum flash tank 88. Gases from the vacuum flash tanks 88 and 90 may become entrained in the motive fluid (e.g. the overhead vapor 92 from the high-pressure flash tank 84) and may be carried through the ejector 96 to a diffuser portion 123 that converts velocity energy into pressure energy. According to certain embodiments, the ejector 96 may include a converging section followed by a diverging section to facilitate conversion of velocity energy into pressure energy. Further, multiple ejectors 96 may be disposed in series, in stages, or in parallel. Moreover, multiple nozzles 122 may be included within an ejector 96 to direct the overhead vapor 92 through the ejector 96.

Discharge 124 may exit the ejector 96 through the diffuser portion 123. The discharge 124 may include the overhead vapor 92 from the high-pressure flash tank 84 and the entrained vapors 106 and 113 from the vacuum flash tanks 88 and 90. The discharge 124 may be directed to a knock out vessel 125 to separate the vapor 70 from liquid components 126. The liquid components 126 may be provided to the grey water tank 121 while the vapor 70 may be discharged overhead and directed to the heat exchanger 66 to heat grey water entering the scrubber 40, as described above with respect to FIG. 1.

In other embodiments, the number and/or the types of flash tanks 84, 86, 88, and 90 included in the black water processing system 46 may vary. For example, in certain embodiments, three flash tanks (e.g., a high-pressure flash tank, a low-pressure or intermediate-pressure flash tank, and a vacuum flash tank) may be included. In another example, the black water processing system 46 may include a high-pressure flash tank, an intermediate-pressure flash tank, a low-pressure flash tank, and a vacuum flash tank. Further, additional equipment, such as pumps, valves, temperature sensors, and pressure transducers, among others, may be included.

Figure 3:
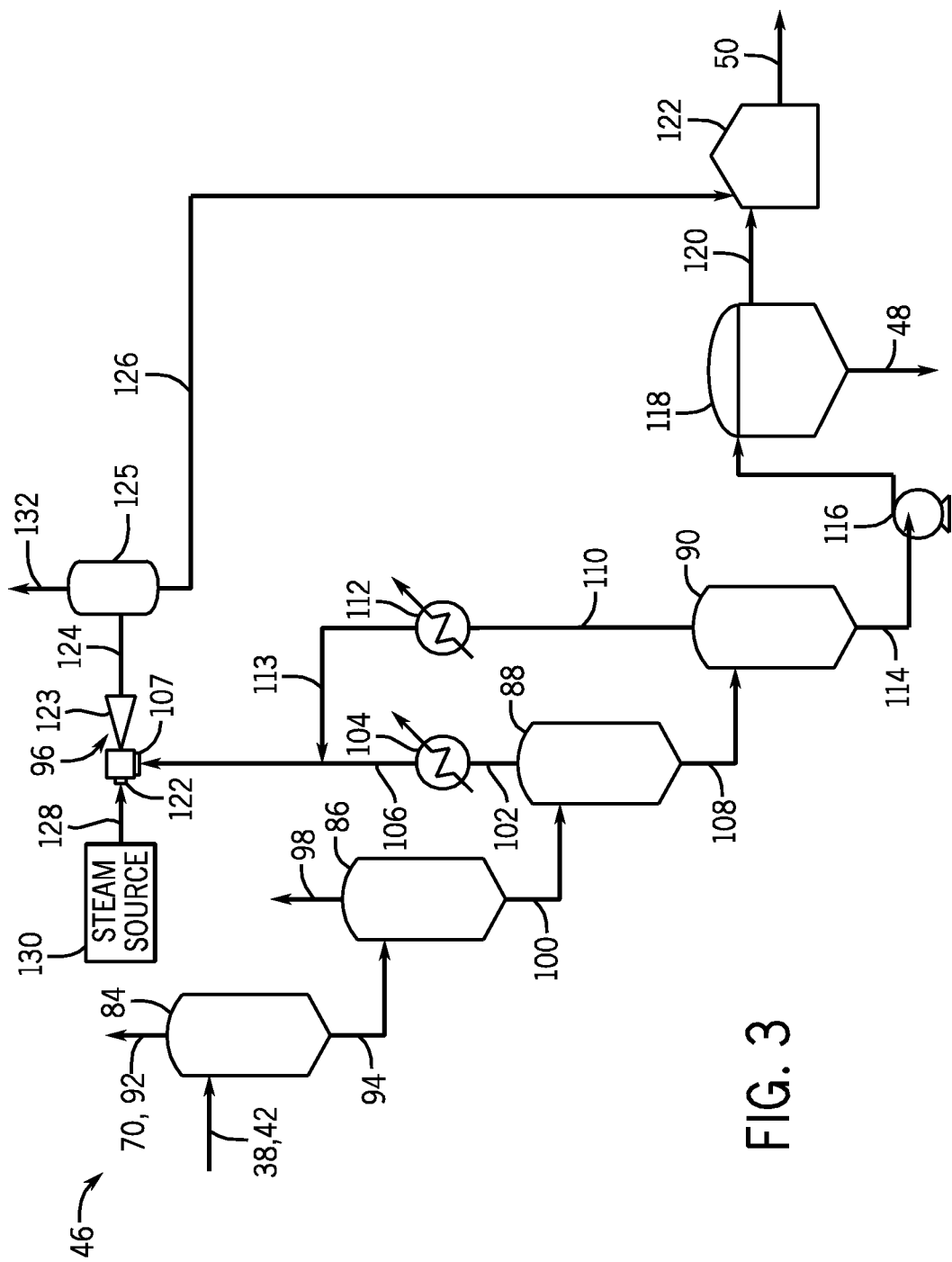
FIG. 3 is a schematic block diagram of another embodiment of the black water processing system of FIG. 1.

FIG. 3 depicts another embodiment of the black water processing system 46. Similar to the black water processing system 46 shown in FIG. 2, the black water processing system 46 includes the four flash tanks 84, 86, 88, and 90. However, rather than using overhead vapor 92 from the high-pressure flash tank 84 as the motive fluid for the ejector 96, steam 128 from a steam source 130 may be employed as the motive fluid. Steam source 130 may include a steam turbine or other suitable steam source. In the embodiment illustrated in FIG. 3, the vapor 92 from the high-pressure flash tank 84 may represent the vapor 70 shown in FIG. 1 that flows directly to the heat exchanger 66 to heat the grey water, as described above with respect to FIG. 1.

The steam 128 may be discharged as a high velocity jet across the suction chamber 107 connected to the vacuum flash tanks 88 and 90. The partially condensed vapors 106 and 113 from the vacuum flash tanks 88 and 90 may become entrained in the steam 128. Accordingly, the discharge 124 may include the steam 128 and the vapors 106 and 113 from the vacuum flash tanks 88 and 90. The discharge 124 may be directed to the knock out vessel 125 to separate vapor 132 from the liquid components 126. As discussed above with respect to FIG. 2, the liquid components 126 may be directed to the grey water tank 122. The vapor 132 may be vented to the atmosphere.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A black water processing system, comprising:
    a vacuum pressure flash tank configured to separate gases from black water;
    a high-pressure flash tank fluidly coupled to the vacuum pressure flash tank and disposed upstream of the vacuum pressure flash tank; and
    an ejector, comprising:
        a suction chamber comprising a first inlet and a second inlet;
        wherein the first inlet of the suction chamber is fluidly coupled to the vacuum pressure flash tank, and the second inlet comprises a nozzle fluidly coupled to the high-pressure flash tank and configured to flow a motive fluid from the high-pressure flash tank across the suction chamber to create a vacuum to draw the gases from within the vacuum pressure flash tank, wherein the motive fluid is different from the gases.

2. The black water processing system of claim 1, wherein the motive fluid comprises steam.

3. The black water processing system of claim 1, wherein the high-pressure flash tank is configured to separate the gases from the black water at a pressure greater than a vacuum pressure of the vacuum pressure flash tank.

4. The black water processing system of claim 1, wherein the motive fluid comprises an overhead discharge from the high-pressure flash tank.

5. The black water processing system of claim 1, wherein the ejector comprises only stationary parts.

6. The black water processing system of claim 1, wherein a discharge of the ejector comprises the motive fluid and the separated gases entrained in the motive fluid.

7. The black water processing system of claim 1, comprising an additional vacuum pressure flash tank configured to separate gases from the black water, wherein the suction chamber of the ejector is coupled to the additional vacuum pressure flash tank.

8. A gasification system, comprising:
    a high-pressure flash tank configured to separate gases from black water to produce a first discharge of the black water and a second discharge of separated gases;
    a vacuum pressure flash tank fluidly coupled to the high-pressure flash tank and disposed downstream of the high-pressure flash tank; and
    an ejector comprising a suction chamber, wherein the suction chamber comprises a first inlet and a second inlet, the first inlet is fluidly coupled to the vacuum pressure flash tank, the second inlet is fluidly coupled to the high-pressure flash tank, and a nozzle of the second inlet is configured to discharge the second discharge across the suction chamber to create a vacuum to draw a vapor discharge from the vacuum pressure flash tank through the first inlet of the suction chamber.

9. The gasification system of claim 8, wherein the second discharge comprises an absolute pressure of at least approximately 10 bar.

10. The gasification system of claim 8, wherein the vacuum comprises an absolute pressure less than approximately 0.5 bar.

11. The gasification system of claim 8, comprising a low-pressure flash tank and the vacuum pressure flash tank disposed in series with the high-pressure flash tank, wherein the low-pressure flash tank and the vacuum pressure flash tank are each configured to separate gases from the black water.

12. The black water processing system of claim 8, comprising a gasifier configured to produce a synthetic gas and the black water.

13. A gasification system, comprising:
    a gasifier configured to produce a synthetic gas and black water;
    a black water processing system fluidly coupled to the gasifier, wherein the black water processing system comprises:
        a high-pressure flash tank configured to flash the black water to produce a first vapor discharge of first separated gases and a first liquid discharge of the black water; and a vacuum pressure flash tank fluidly coupled to the high-pressure flash tank, wherein the vacuum pressure flash tank is configured to flash the black water to produce a second vapor discharge of second separated gases and a second liquid discharge of the black water; and an ejector comprising a suction chamber, wherein the suction chamber comprises a first inlet and a second inlet, the first inlet is fluidly coupled to the vacuum pressure flash tank, the second inlet is fluidly coupled to the high-pressure flash tank and a nozzle of the second inlet is configured to discharge the first vapor discharge across the suction chamber to pull the second vapor discharge into the ejector from the vacuum pressure flash tank through the first inlet.

14. The gasification system of claim 13, comprising a condenser configured to condense at least a portion of the second vapor discharge upstream of the ejector.

15. The gasification system of claim 13, comprising a scrubber configured to scrub the synthetic gas to produce additional black water, wherein the high-pressure flash tank is configured to flash the additional black water.

16. The gasification system of claim 15, comprising a heat exchanger configured to transfer heat from a discharge of the ejector to grey water entering the scrubber.

17. The gasification system of claim 13, wherein the high-pressure flash tank has a first absolute pressure of at least approximately 10 bar and the vacuum pressure flash tank has a second absolute pressure less than approximately 0.5 bar.

18. The gasification system of claim 13, comprising a low-pressure flash tank configured to flash the first liquid discharge to produce a third vapor discharge of third separated gases and a third liquid discharge of the black water, wherein the vacuum pressure flash tank is configured to flash the third liquid discharge.

19. The gasification system of claim 13, comprising an additional vacuum pressure flash tank configured to flash the black water to produce a fourth vapor discharge of fourth separated gases and a fourth liquid discharge of the black water, wherein the suction chamber of the ejector is coupled to the additional vacuum pressure flash tank.

* * * * *